(12) United States Patent
Anderson (10) Patent No.: US 7,889,709 B2
(45) Date of Patent: Feb. 15, 2011

(54) DISTINGUISHING BETWEEN DATA PACKETS SENT OVER THE SAME SET OF CHANNELS

(75) Inventor: Nicholas William Anderson, Bristol (GB)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 11/209,465

(22) Filed: Aug. 23, 2005

(65) Prior Publication Data

US 2007/0047513 A1 Mar. 1, 2007

(51) Int. Cl.
*H04J 3/24* (2006.01)
*H04L 12/66* (2006.01)

(52) U.S. Cl. ........................... 370/349; 370/352

(58) Field of Classification Search .......... 370/343, 370/345, 349, 352, 401, 469
See application file for complete search history.

(56) References Cited

U.S. PATENT DOCUMENTS

| | | | | |
|---|---|---|---|---|
| 5,872,777 | A * | 2/1999 | Brailean et al. | 370/349 |
| 5,881,105 | A * | 3/1999 | Balachandran et al. | 375/259 |
| 6,134,662 | A | 10/2000 | Levy et al. | |
| 6,201,811 | B1 * | 3/2001 | Larsson et al. | 370/310.1 |
| 6,268,808 | B1 * | 7/2001 | Iryami et al. | 341/51 |
| 6,438,119 | B1 * | 8/2002 | Kim et al. | 370/335 |
| 6,535,547 | B1 * | 3/2003 | Lyckegård et al. | 375/145 |
| 6,628,641 | B1 * | 9/2003 | Strawczynski et al. | 370/349 |
| 6,671,511 | B1 * | 12/2003 | Forssell et al. | 455/452.1 |
| 6,678,249 | B2 * | 1/2004 | Toskala et al. | 370/236 |
| 6,744,746 | B1 * | 6/2004 | Bartelme | 370/329 |
| 6,804,257 | B1 * | 10/2004 | Benayoun et al. | 370/471 |
| 6,831,913 | B1 * | 12/2004 | Vialen | 370/349 |
| 7,130,295 | B2 * | 10/2006 | Kim et al. | 370/349 |
| 7,167,457 | B2 * | 1/2007 | Vanttinen et al. | 370/328 |
| 7,283,508 | B2 * | 10/2007 | Choi et al. | 370/341 |
| 2002/0110154 | A1 * | 8/2002 | Odenwalder | 370/503 |

(Continued)

FOREIGN PATENT DOCUMENTS

EP  1507422 A1  2/2005

(Continued)

OTHER PUBLICATIONS

3rd Generation Partnership Project, Technical Specification Group Services and System Aspects, Technical Specifications and Technical Reports for a UTRAN-based 3GPP system, (Release 6) 3GPP TS 21.101 V6.2.0 (Jun. 2005).

(Continued)

*Primary Examiner*—George Eng
*Assistant Examiner*—Christopher M Brandt
(74) *Attorney, Agent, or Firm*—Oblon, Spivak, McClelland, Maier & Neustadt, L.L.P.

(57) ABSTRACT

Embodiments of the present invention distinguish a first type of data packet transmitted over a random access communication channel of a wireless cellular communications system from a second type of data packet transmitted over the same random access communication channel, allowing the first and second data packet data packet types to share a common set of random access channels through the use of different types of channel coding. This reduces data packet collision probability by eliminating the need to segregate the set of random access channels according to data packet type. Backward compatibility with legacy base stations that handle only the first data packet type is maintained in that no changes to the first data packet type are needed.

25 Claims, 7 Drawing Sheets

U.S. PATENT DOCUMENTS

| | | | |
|---|---|---|---|
| 2002/0159393 A1* | 10/2002 | Smith et al. | 370/249 |
| 2003/0031158 A1* | 2/2003 | Kasturi et al. | 370/342 |
| 2003/0103480 A1* | 6/2003 | You et al. | 370/335 |
| 2003/0161471 A1 | 8/2003 | Jou et al. | |
| 2004/0136336 A1* | 7/2004 | Nakamura et al. | 370/328 |
| 2004/0218579 A1* | 11/2004 | An | 370/349 |
| 2004/0228320 A1* | 11/2004 | Laroia et al. | 370/349 |
| 2005/0089020 A1* | 4/2005 | Ahlback et al. | 370/352 |
| 2005/0105487 A1* | 5/2005 | Rudolf et al. | 370/329 |
| 2005/0111448 A1* | 5/2005 | Narad | 370/389 |
| 2006/0067364 A1* | 3/2006 | Jung et al. | 370/469 |
| 2006/0146858 A1* | 7/2006 | Kim | 370/432 |
| 2006/0274715 A1* | 12/2006 | Hahm et al. | 370/349 |
| 2007/0014274 A1* | 1/2007 | Choi | 370/349 |
| 2007/0019581 A1* | 1/2007 | Mekala et al. | 370/321 |
| 2007/0025553 A1* | 2/2007 | Beuque et al. | 380/263 |
| 2007/0064641 A1* | 3/2007 | Laroia et al. | 370/320 |
| 2007/0155388 A1* | 7/2007 | Petrovic et al. | 455/442 |

FOREIGN PATENT DOCUMENTS

| | | |
|---|---|---|
| JP | 2006-504338 | 2/2006 |

OTHER PUBLICATIONS

3rd Generation Partnership Project, Technical Specification Group Services and System Aspects, Evolution of 3GPP System, (Release 6) 3GPP TR 21.902 V6.0.0 (Sep. 2003).

3rd Generation Partnership Project, Technical Specification Group Services and Systems Aspects, Network Architecture (Release 6) 3GPP TS 23.002 V6.8.0 (Jun. 2005).

3rd Generation Partnership Project, Technical Specification Group Radio Access Network, User Equipment (UE) radio transmission and reception (FDD) (Release 6) 3GPP TS 25.101 V6.8.0 (Jun. 2005).

3rd Generation Partnership Project, Technical Specification Group Radio Access Network, User Equipment (UE) radio transmission and reception (TDD) (Release 6) 3GPP TS 25.102 V6.1.0 (Jun. 2005).

3rd Generation Partnership Project, Technical Specification Group Radio Access Network, Base Station (BS) radio transmission and reception (FDD) (Release 6) 3GPP TS 25.104 V6.9.0 (Jun. 2005).

3rd Generation Partnership Project, Technical Specification Group Radio Access Network, Base Station (BS) radio transmission and reception (TDD) (Release 6) 3GPP TS 25.105 V6.2.0 (Dec. 2004).

3rd Generation Partnership Project, Technical Specification Group Radio Access Network, Physical channels and mapping of transport channels onto physical channels (FDD) (Release 6), 3GPP TS 25.211 V6.5.0 (Jun. 2005).

3rd Generation Partnership Project, Technical Specification Group Radio Access Network, Multiplexing and channel coding (FDD) (Release 6), 3GPP TS 25.212 V6.5.0 (Jun. 2005).

3rd Generation Partnership Project, Technical Specification Group Radio Access Network, Spreading and modulation (FDD) (Release 6) 3GPP TS 25.213 V6.3.0 (Jun. 2005).

3rd Generation Partnership Project, Technical Specification Group Radio Access Network, Physical layer procedures (FDD) (Release 6) 3GPP TS 25.214 V6.6.0 (Jun. 2005).

3rd Generation Partnership Project, Technical Specification Group Radio Access Network, Physical layer—Measurements (FDD) (Release 6) 3GPP TS 25.215 V6.3.0 (Jun. 2005).

3rd Generation Partnership Project, Technical Specification Group Radio Access Network, Physical channels and mapping of transport channels onto physical channels (TDD) (Release 6) 3GPP TS 25.221 V6.4.1 (Jun. 2005).

3rd Generation Partnership Project, Technical Specification Group Radio Access Network, Multiplexing and channel coding (TDD) (Release 6 ) 3GPP TS 25.222 V6.2.0 (Dec. 2004).

3rd Generation Partnership Project, Technical Specification Group Radio Access Network, Spreading and modulation (TDD) (Release 6) 3GPP TS 25.223 V6.0.0 (Dec. 2003).

3rd Generation Partnership Project, Technical Specification Group Radio Access Network, Physical layer procedures (TDD) (Release 6) 3GPP .TS 25.224 V6.5.0 (Jun. 2005).

3rd Generation Partnership Project, Technical Specification Group Radio Access Network, Physical layer, Measurements (TDD) (Release 6) 3GPP TS 25.225 V6.1.0 (Mar. 2004).

3rd Generation Partnership Project, Technical Specification Group Radio Access Network, FDD Enhanced Uplink, Overall description, Stage 2 (Release 6) 3GPP TS 25.309 V6.3.0 (Jun. 2005).

3rd Generation Partnership Project, Technical Specification Group Radio Access Network, Feasibility Study on Uplink Enhancements for UTRA TDD (Release 6) 3GPP TR 25.804 V2.0.0 (Feb. 2005).

3rd Generation Partnership Project, Technical Specification Group Radio Access Network, FDD Enhanced Uplink, Physical Layer Aspects (Release 6) 3GPP TR 25.808 V2.0.0 (Mar. 2005).

3rd Generation Partnership Project, Technical Specification Group Radio Access Network, Physical layer aspects of UTRA High Speed Downlink Packet Access (Release 4) 3GPP TR 25.848 V4.0.0 (Mar. 2001).

3rd Generation Partnership Project, Technical Specification Group Radio Access Network, Feasibility Study considering the viable deployment of UTRA in additional and diverse spectrum arrangements (Release 6) 3GPP TR 25.889 V6.0.0 (Jun. 2003).

3rd Generation Partnership Project, Technical Specification Group Radio Access Network, Feasibility Study for Enhanced Uplink for UTRA FDD (Release 6) 3GPP TR 25.896 V6.0.0 (Mar. 2004).

International Search Report and Written Opinion mailed Oct. 24, 2008, for PCT Application No. PCT/EP2006/064460 filed Jul. 20, 2006, 11 pages.

"3rd Generation Partnership Project; Technical Specification Group Services and System Aspects; Vocabulary for 3GPP Specifications (Release 6)," (Jun. 2005). 3GPP:Valbonne, France, TR 21.905 v6.9.0:1-54.

Office Action dated Aug. 9, 2010, Chinese Appln. No. 200680030636.4, (w/English Translation) pp. 1-11.

Office Action dated Aug. 24, 2010, Japanese Appln. No. 2008-527414, (w/English Translation) pp. 1-5.

* cited by examiner

(PRIOR ART)

DISTINGUISHING BETWEEN DATA PACKETS SENT OVER THE SAME SET OF CHANNELS

TECHNICAL FIELD

This invention relates to a system and method for identifying different types of data packets transmitted over a common random access channel. The invention is applicable to, but not limited to, a Universal Terrestrial Radio Access (UTRA) Wideband-CDMA system, as used in the Universal Mobile Telecommunication Standard (UMTS).

BACKGROUND ART

Wireless communication systems, for example cellular telephony or private mobile radio communication systems, typically provide for radio telecommunication links to be arranged between a plurality of base transceiver stations (BTSs) and a plurality of subscriber units, often termed mobile stations (MSs).

Wireless communication systems are distinguished over fixed communication systems, such as the public switched telephone network (PSTN), principally in that mobile stations move among BTS coverage areas, and in doing so encounter varying radio propagation environments.

In a wireless communication system, each BTS has associated with it a particular geographical coverage area (or cell). The coverage area is defined by a particular range where the BTS can maintain acceptable communications with MSs operating within its serving cell. Coverage areas for a plurality of BTSs can be aggregated for an extensive coverage area. An embodiment of the present invention is described with reference to the Third Generation Partnership Project (3GPP) defining portions of the Universal Mobile Telecommunication Standard (UMTS), including the time division duplex (TD-CDMA) mode of operation. 3GPP standards and technical release relating to the present invention include 3GPP TR 25.211, TR 25.212, TR 25.213, TR 25.214, TR 25.215, TR 25.808, TR 25.221, TR 25.222, TR 25.223, TR 25.224, TR 25.225, TS 25.309, TR25.804, TS 21.101, and TR 21.905 hereby incorporated within this application, in their entireties by reference. 3GPP documents can be obtained from 3GPP Support Office, 650 Route des Lucioles, Sophia Antipolis, Valbonne, FRANCE, or on the Internet at www.3gpp.org.

In UMTS terminology, a BTS is referred to as a Node B, and subscriber equipment (or mobile stations) are referred to as user equipment (UEs). With the rapid development of services provided to users in the wireless communication arena, UEs can encompass many forms of communication devices, from cellular phones or radios, through personal data accessories (PDAs) and MP-3 players to wireless video units and wireless internet units.

In UMTS terminology, the communication link from the Node B to a UE is referred to as the downlink channel. Conversely, the communication link from a UE to the Node B is referred to as the uplink channel.

In such wireless communication systems, methods for simultaneously using available communication resources exist where such communication resources are shared by a number of users (mobile stations). These methods are sometimes termed multiple access techniques. Typically, some communication resources (say communications channels, time-slots, code sequences, etc) are used for carrying traffic while other channels are used for transferring control information, such as call paging, between the Node Bs and the UEs.

It is worth noting that transport channels exist between the physical layer and the medium access control (MAC) in the system hierarchy. Transport channels can define how data is transferred over the radio interface. Logical channels exist between MAC and the radio link control (RLC)/radio resource control (RRC) layers. Logical channels define what is transported. Physical channels define what is actually sent over the radio interface, i.e. between layer 1 entities in a UE and a Node B.

A number of multiple access techniques exist, whereby a finite communication resource is divided according to attributes such as: (i) frequency division multiple access (FDMA) in which one of a plurality of channels at different frequencies is assigned to a particular mobile station for use during the duration of a call; (ii) time division multiple access (TDMA) whereby each communication resource, say a frequency channel used in the communication system, is shared among users by dividing the resource into a number of distinct time periods (time-slots, frames, etc.); and (iii) code division multiple access (CDMA) whereby communication is performed by using all of the respective frequencies, at all of the time periods, and the resource is shared by allocating each communication a particular code, to differentiate desired signals from undesired signals.

Within such multiple access techniques, different duplex (two-way communication) paths are arranged. Such paths can be arranged in a frequency division duplex (FDD) configuration, whereby a frequency is dedicated for uplink communication and a second frequency is dedicated for downlink communication. Alternatively, the paths can be arranged in a time division duplex (TDD) configuration, whereby a first time period is dedicated for uplink communication and a second time period is dedicated for downlink communication on an alternating basis.

Present day communication systems, both wireless and wire-line, have a requirement to transfer data between communications units. Data, in this context, includes signaling information and traffic such as data, video, and audio communication. Such data transfer needs to be effectively and efficiently provided for, in order to optimize the use of limited communication resources.

Recent focus in 3GPP has been on the introduction and development of an "enhanced uplink" feature to provide fast scheduling and allocation of system resources for uplink packet-based data, and to serve as a compliment to HSDPA (high-speed downlink packet access). Within HSDPA (downlink), a scheduling (or downlink resource allocation) entity is placed in the Node-B network entity (previously scheduling was performed by a Radio network controller, RNC). The scheduler resides within a new Medium Access Control (MAC) entity termed the MAC-hs (the "hs" denoting that the MAC entity is associated with HSDPA). Similarly, for enhanced uplink, the uplink scheduler has also been moved from the RNC (where it resided in pre-enhanced-uplink implementations) into a new MAC entity termed MAC-e, located within the Node-B.

For HSDPA (downlink) and enhanced uplink, scheduling is generally distributed among Node-Bs such that an uplink and downlink scheduler exists in each cell which is largely, or wholly unaware of scheduling decisions made in other cells. Schedulers in different cells typically operate independently, although schedulers for cells served by the same Node-B (same basestation) may cooperate. In some implementations there may also be cooperation between uplink and downlink schedulers. Feedback is provided to the uplink and downlink schedulers from the UE pertaining to current radio conditions and this information is used by the schedulers to adjust parameters of the uplink or downlink radio links. Examples of link parameters which may be adjusted in response by the scheduler to maintain an acceptable quality or reliability of radio communication between the base station and the UE. include: (i) the data rate; (ii) the transmit power; (iii) the modulation format (e.g. QPSK/8-PSK/16-QAM); and (iv) the degree of FEC coding applied In the case of enhanced uplink, control of the UE transmission power and data rate takes the form of grant commands sent from one or more uplink schedulers to the same UE. The absolute grant channel (E-AGCH) is used by the serving cell scheduler to convey information to the UE about which resources it may use. Uplink resources are generally thought of in CDMA systems as "Rise-over-Thermal" (RoT) resources wherein an allowable received-interference level threshold is set for the base station (relative to thermal noise in the receiver) and each user is effectively granted a fraction of this allowable received interference power. As the allowable RoT set-point is increased, so the interference level at the base station increases and the harder it becomes for a UEs signal to be detected. Thus, the consequence of increasing the RoT is that the coverage area of the cell is reduced. The RoT set-point must therefore be configured correctly for a given deployment to ensure the desired system coverage is met.

It is then also clear, that accurate control of the RoT and other system resources granted to active users in the system is critical for efficient system operation. Grants of resources to UE's which are not accurately tailored to the UE's radio conditions or data transmission needs are wasteful of system resources.

It is therefore important that the uplink scheduler is informed and updated with minimal delay as to any change in each active UE's radio conditions or data transmission requirements. For example, if a user who has been relatively idle in recent times tries to send an email attachment, it is important that the uplink scheduler is made aware of the UE's requirement to send data with minimal delay such that system resources can be granted and a fast response time is achieved. It is also beneficial if the uplink scheduler is made aware of the current radio conditions for the UE such that the nature and parameters of the assigned transmission resources can be adjusted to suit those radio conditions.

For the purposes of conveying this type of request for transmission resources, and any associated updates of radio conditions, from the UE to the enhanced uplink scheduler in Node-B, a new Node-B terminated random access channel is considered, termed the E-PRACH. This physical channel is used within a conceptual enhanced uplink system extension for 3GPP UTRA TDD to carry a timely indication to the Node-B scheduler of a users need for allocation of uplink shared transmission resources.

The random access channels (physical random access channels, "PRACH," in 3GPP terminology) work as follows: When the need for transmission is identified in the user equipment, a transmission channel or "code" is selected at random from the set of configured channels. Transmission is then made on that channel and it is hoped that no other user transmits on the same channel at the same time; this results in a collision and typically detection or decoding failure of all colliding users on that channel.

The probability of collision increases with the transmission probability and with a decreasing number of configured channels. Usage of the E-PRACH channel should not be overly frequent due to the fact that it should only be required at the start of each packet call, (ie: following short periods of inactivity). However, a sufficient amount of code resource ("$N_E$" E-PRACH channels) should be assignable for E-PRACH usage such that the probability of E-PRACH collisions between users is maintained at a suitably low level. Fewer assigned E-PRACH channels will result in an increased probability of collision for a given system load. A high probability of E-PRACH collision will degrade transmission latency and ultimately, perceived user throughput because the necessary information regarding a users need for transmission resources may be delayed or lost on transit from the UE to the Node-B scheduler.

Existing releases (eg: release 99/4/5/6) of 3GPP UTRA TDD already provide support for a physical random access channel (termed here R99 PRACH). Again, an appropriate number ("$N_{99}$") of R99 PRACH channels must be configured to maintain acceptable probability of collision for a given system load. Mechanisms are also provided for the network to control the collision probability via cell broadcast control signaling of so-called "RACH-persistence" values. These are used in each user terminal to adjust the probability of RACH transmission. Thus at high loads, the network can command UEs to reduce transmission of RACH in an attempt to maintain acceptable collision probability.

For a given number of total random access channels ($N_{TOT}$) the overall collision probability for both E-PRACH and R99 PRACH may be reduced if the entire available set of random access channels is used simultaneously for both E-PRACH and R99 PRACH transmissions.

Correspondingly, if the total available set of random access channels ($N_{TOT}$) is divided into a set that may be used for R99 PRACH and a non-intersecting set that may be used for E-PRACH, then the collision probability for both R99 PRACH and E-PRACH is degraded when compared to the case where the set of random access channels is not segmented and is instead shared between the two PRACH types.

This "channel sharing" capability also allows for an accommodation of changes in the volume of offered PRACH traffic for each PRACH type over time. For example, if during some hours of service, 80% of PRACH's are R99 type and 20% are E-type, then a system implementing a hard-split in random access channel resources would need to reconfigure those resources such that an appropriate amount of the resource was assigned to each PRACH type. If such reconfiguration was not performed then the system would suffer from suboptimal PRACH capacity on one of the PRACH types. Reconfiguration would need to be performed each time a change in the offered PRACH traffic volume ratio (R99/E-PRACH) was detected. On the other hand, if the resources were shared between PRACH types then the means for such a reconfiguration need not exist.

Figure 1A:
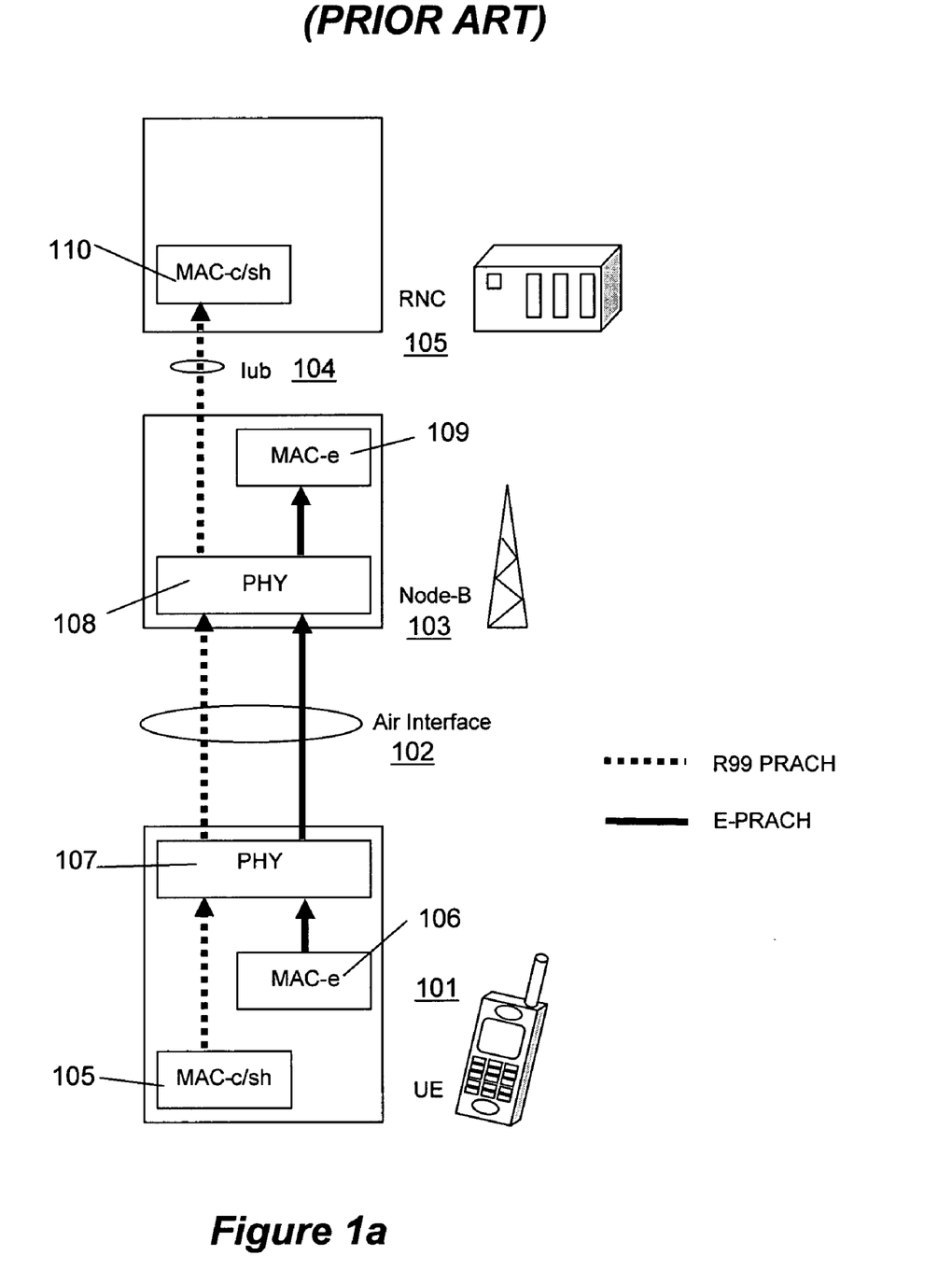
FIG. 1a illustrates the transport of R99 PRACH and E-PRACH data packets over two different air interface channels in a 3GPP UTRA wireless system.
Figure 1B:
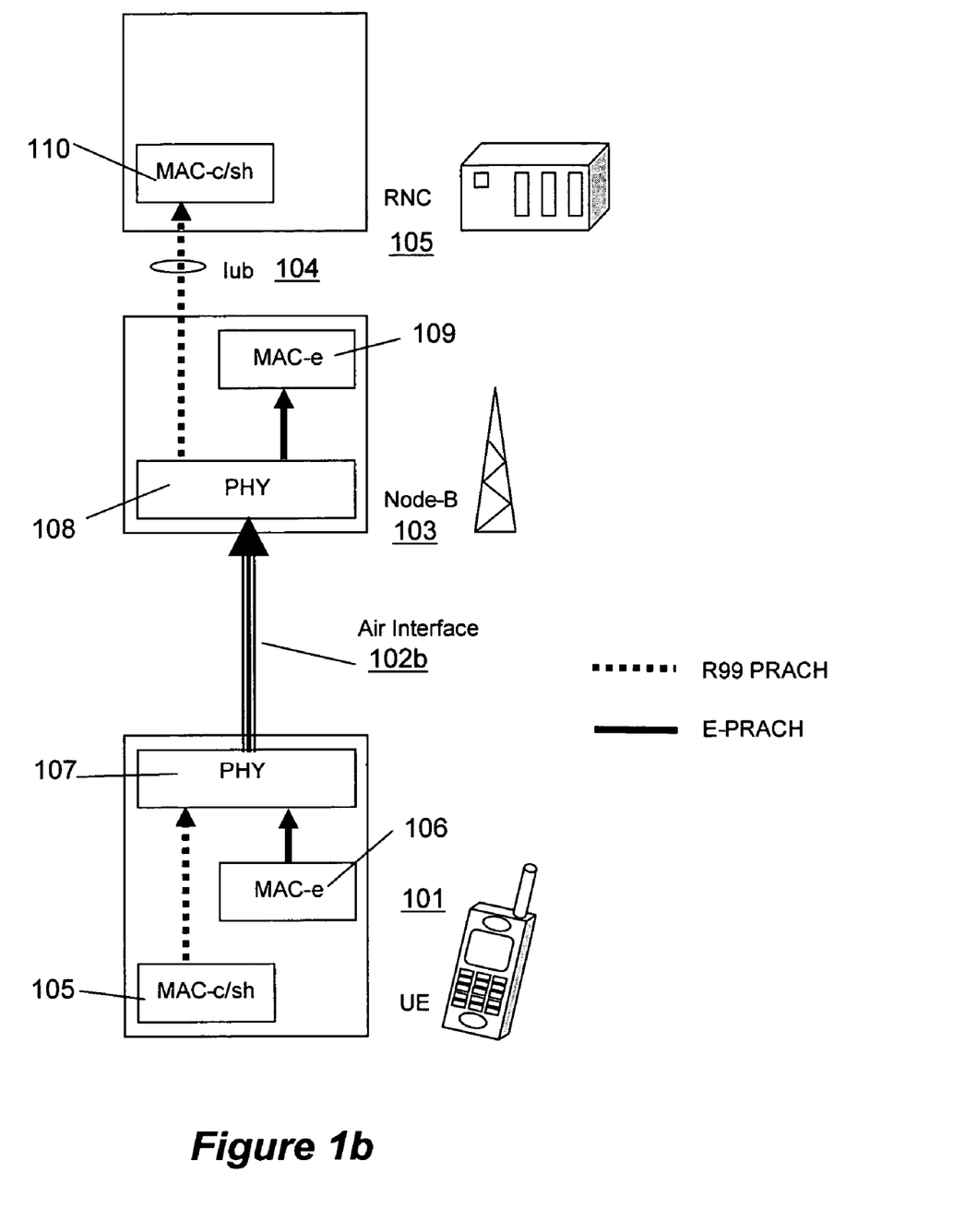
FIG. 1b illustrates the transport of R99 PRACH and E-PRACH data packets over a single air interface channel according to an embodiment of the invention.

It is therefore desirable to allow E-PRACH and R99 PRACH to transmit on a common set of available random access channels 102b in FIG. 1b. Although this is capable of improving both R99 PRACH and E-PRACH efficiency, this approach does introduce the problem of how to reliably distinguish an E-PRACH from a PRACH at the base station receiver. The problem arises because different actions need to be taken by the base station on receipt of a R99 PRACH or an E-PRACH. The R99 PRACH is terminated at the radio network controller, "RNC" (MAC-c/sh) and as such any detected R99 PRACH should be decoded by the base station and forwarded over the Iub interface between a Node-B and the RNC. On the other hand, E-PRACH is terminated at Node-B (MAC-e) and as such should not be forwarded over Iub; instead the information contained within it should be forwarded internally within the base station to the uplink scheduler in MAC-e.

The situation in which the random access resources are segregated into resources exclusively assigned to R99

PRACH, and resources exclusively assigned to E-PRACH is depicted in FIG. 1a. User Equipment 101 can originate R99 PRACH and E-PRACH data packets in its MAC-c/sh and MAC-e medium access control entities, respectively. R99 PRACH and E-PRACH data packets are both sent through the physical layer 107 of UE 101, where they are assigned transmission resources on the air interface 102 depending on the PRACH type (E-PRACH/R99-PRACH), and are received by the physical layer 108 of Node-B 103. The PRACH type is determined by the Node-B simply by the random access channel the signal was received on. R99 PRACH data packets are then forward over the Node-B/RNC interface Iub 104 to RNC 105, where they are terminated in the MAC-c/sh 110. E-PRACH data packets are forwarded internally to the Node-B from the Node-B physical layer to the Node-B MAC-e 109.

It is desirable to avoid the segregation of random access resources into sets of channels exclusively for use by a single PRACH type, and instead to allow PRACH types to share a common set of random access resources. For backward compatibility with legacy Node-Bs that don't have E-PRACH capability, it is also desirable to be able to introduce E-PRACH into existing systems without requiring modification to R99 PRACH data packets.

SUMMARY OF THE INVENTION

Embodiments of the present invention distinguish a first type of data packet transmitted over a random access communication channel of a cellular communications system from a second type of data packet transmitted over the same random access communication channel, allowing the first and second data packet data packet types to share a common set of random access channels through the use of different types of channel coding. This reduces data packet collision probability by eliminating the need to segregate the set of random access channels according to data packet type. Backward compatibility with legacy base stations that handle only the first data packet type is maintained in that no changes to the first data packet type are needed.

DETAILED DESCRIPTION OF THE INVENTION

FIG. 1b shows the situation in which some transmission data packets are generated by MAC-e 106 and some transmission data packets are generated by MAC-c/sh 105 in the UE 101. E-PRACH type data packets are generated by MAC-e and R99-PRACH type data packets are generated by MAC-c/sh. Pre-allocated transmission resources are not available for transmission of the data packets and so the data is sent using random access resources. A set of random access resources (channels) has been previously configured in the UE by the RNC 105. Both data packet types may be mapped to any one of the set of random access channels (with the restriction that one packet is mapped to one channel). Thus E-PRACH and R99-PRACH data packet types share a common set of random access channels over the air interface 102b.

The physical layer 107 in the UE applies a modified forward error correction scheme or data packet processing scheme to E-PRACH data packet transmissions when compared to the forward error correction or data packet processing scheme applied to R99 PRACH data packet transmissions.

For a particular random access channel, the physical layer 108 in the Node-B 103 may thus detect a random access transmission, corresponding to either an E-PRACH data packet transmission or to a R99-PRACH data packet transmission. The physical layer 108 attempts to decode the detected transmission using a first decoder suited to successful decoding of E-PRACH data packets encoded using a first forward error correction or data packet processing scheme by the physical layer 107 in the UE, and a first data integrity metric is generated by the Node-B physical layer 103. The Node-B physical layer also attempts to decode the detected transmission using a second decoder suited to successful decoding of R99-PRACH data packets encoded using a second forward error correction or data packet processing scheme by the physical layer 107 in the UE, and a second data integrity metric is generated.

The Node-B physical layer forms a decision as to the data packet type based at least in part on the first and second data integrity metrics. If the decision is that the packet was of E-PRACH type, the data is routed to the MAC-e 109 in the Node-B. If the decision is that the packet was of R99 PRACH type, the data is routed over the Iub interface 104 to the MAC-c/sh 110 in the RNC 105. Thus, separability of the data packet types has been achieved whilst allowing for the packet data types to be mapped to a common set of random access channels.

Some embodiments of the invention rely upon the channel coding between E-PRACH and R99 PRACH data packets being significantly different, such that when an attempt is made to decode a R99 PRACH with the E-PRACH decoder (and vice versa), the decode fails and a cyclic redundancy check (CRC) subsequently fails, or alternatively a decoder metric indicates uncertainty as to the integrity of the decoded information. This then indicates to the Node-B receiver the type of data packet, R99 PRACH or E-PRACH, received over a random access channel.

For acceptable operation, there should be a high probability of correctly identifying a R99 PRACH data packet when one was sent, and correctly identifying an E-PRACH data packet when one was sent. Additionally, there should be a low probability of identifying a PRACH data packet as a R99 PRACH data packet when in-fact an E-PRACH data packet was sent, and identifying a PRACH data packet as a E-PRACH data packet when in-fact a R99 PRACH data packet was sent. In order to achieve the above, significantly different transport channel processing should be applied to R99-PRACH data packets and E-PRACH data packets such that they may be correctly detected and separated by the Node-B PHY (physical layer).

Figure 2:
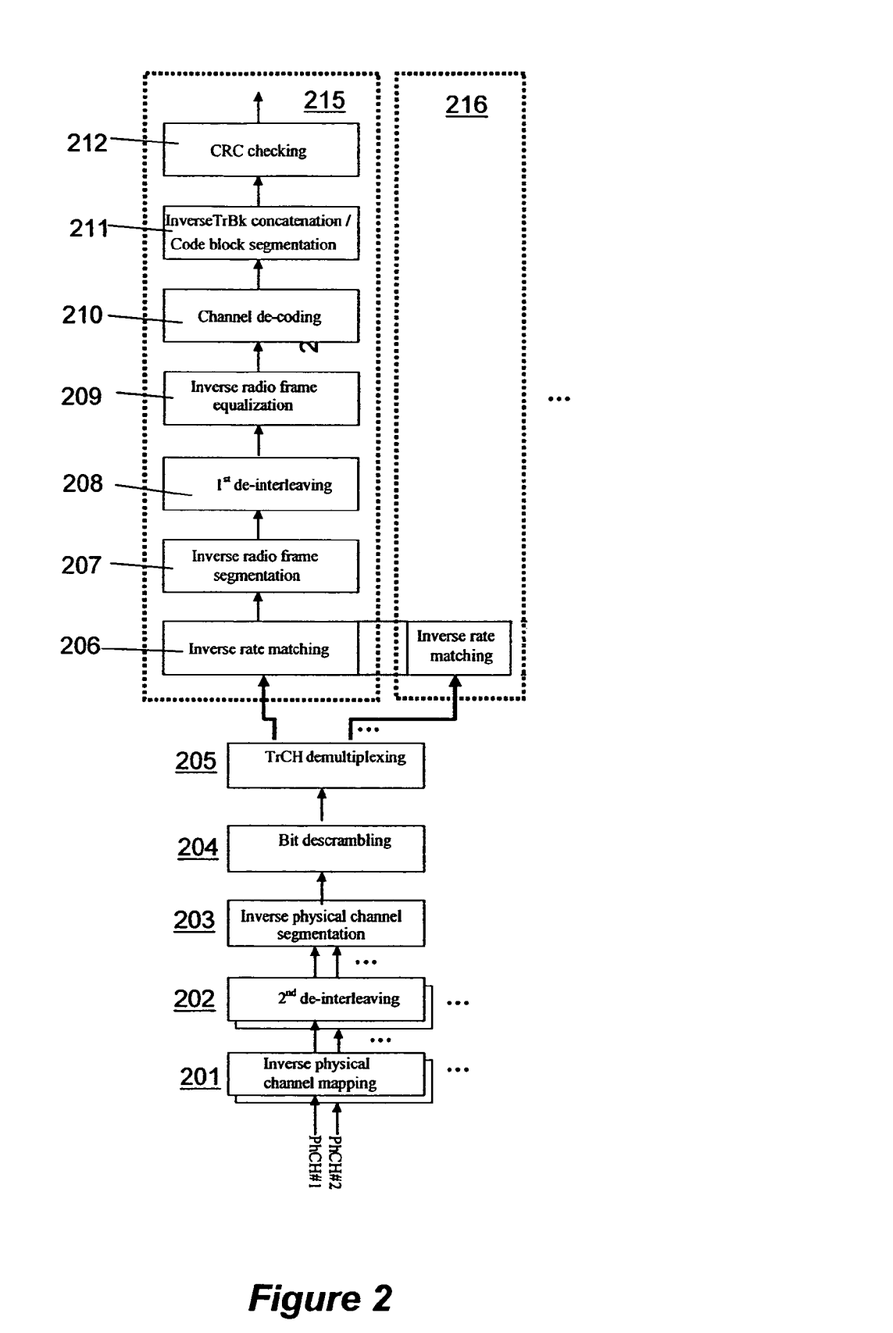
FIG. 2 illustrates an example of data packet processing in a UE of a 3GPP UTRA wireless system.

Generally, one or more of the existing transport channel processing functions could be modified to achieve this. The existing processing chain is shown in FIG. 2 (adapted from 3GPP TS 25.222). It should be appreciated that FIG. 2 doesn't necessarily describe the exact processing used for E-PRACH, since at the time of writing this application is not yet defined within the specifications. However it is anticipated that many parts of the R99 processing chain shown in the figure could be reused for E-PRACH processing facilitating the embodiments described herein. Other embodiments that do not rely on 3GPP R99 processing blocks or functions are also conceivable and are obvious by extension to a person skilled in the art.

Channel coding parameters for data packets that are useful for the differentiation of the PRACH data packet types include (but are not limited to): (i) the number of information bits carried; (ii) the type of forward error correction (FEC) used—e.g. turbo or convolutional coding; (iii) the rate matching pattern employed; (iv) interleaving patterns; (v) bit scrambling patterns applied; and (vi) CRC field scrambling or masking.

PRACH type detection can be done by a Node-B in either parallel (FIG. 3), or sequential (FIG. 4) embodiments. Sequential and parallel decoding of R99 PRACH and E-PRACH data packets are essentially very similar. Both can be made to have similar detection reliability and it is simply that for parallel decoding there is a (small) possibility that a received PRACH data packet could be simultaneously detected as both a R99 PRACH data packet and an E-PRACH data packet whereas for sequential decoding this scenario cannot occur. Higher layer (RNC) checks on the R99 PRACH data packets could improve the false-detection reliability of E-PRACH data packets that have been incorrectly identified at the Node-B as R99 PRACH data packets.

Figure 3:
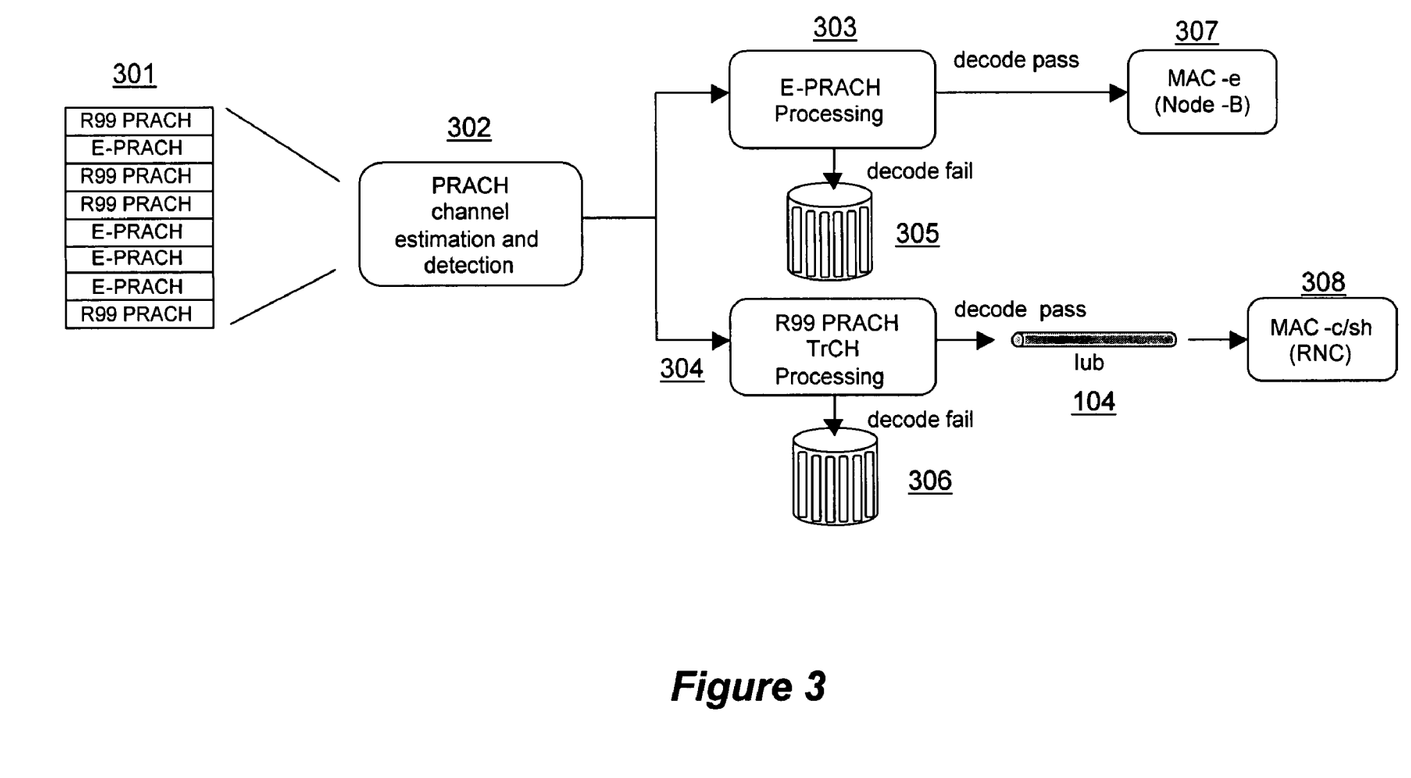
FIG. 3 illustrates an embodiment of the invention with parallel data packet decoding.

Referring to FIG. 3, a mixture of R99 PRACH and E-PRACH data packets arrive at the receivers physical layer front end 302 of a Node-B for common processing. Subsequently, each packet is sent to both E-PRACH and R99 PRACH processing blocks 303 and 034, respectively. If E-PRACH decoding succeeds, the data packet is passed on to the Node-B's MAC-e 307 as an E-PRACH data packet, otherwise the data packet is discarded 305 as a corrupted E-PRACH data packet or a different data packet type. If R99 PRACH decoding 304 succeeds, the data packet is transmitted through Iub 104 to the MAC-c/sh or RNC 308 as a R99 PRACH data packet, otherwise, the data packet is discarded 306 as a corrupted R99 PRACH data packet or a different data packet type.

Figure 4:
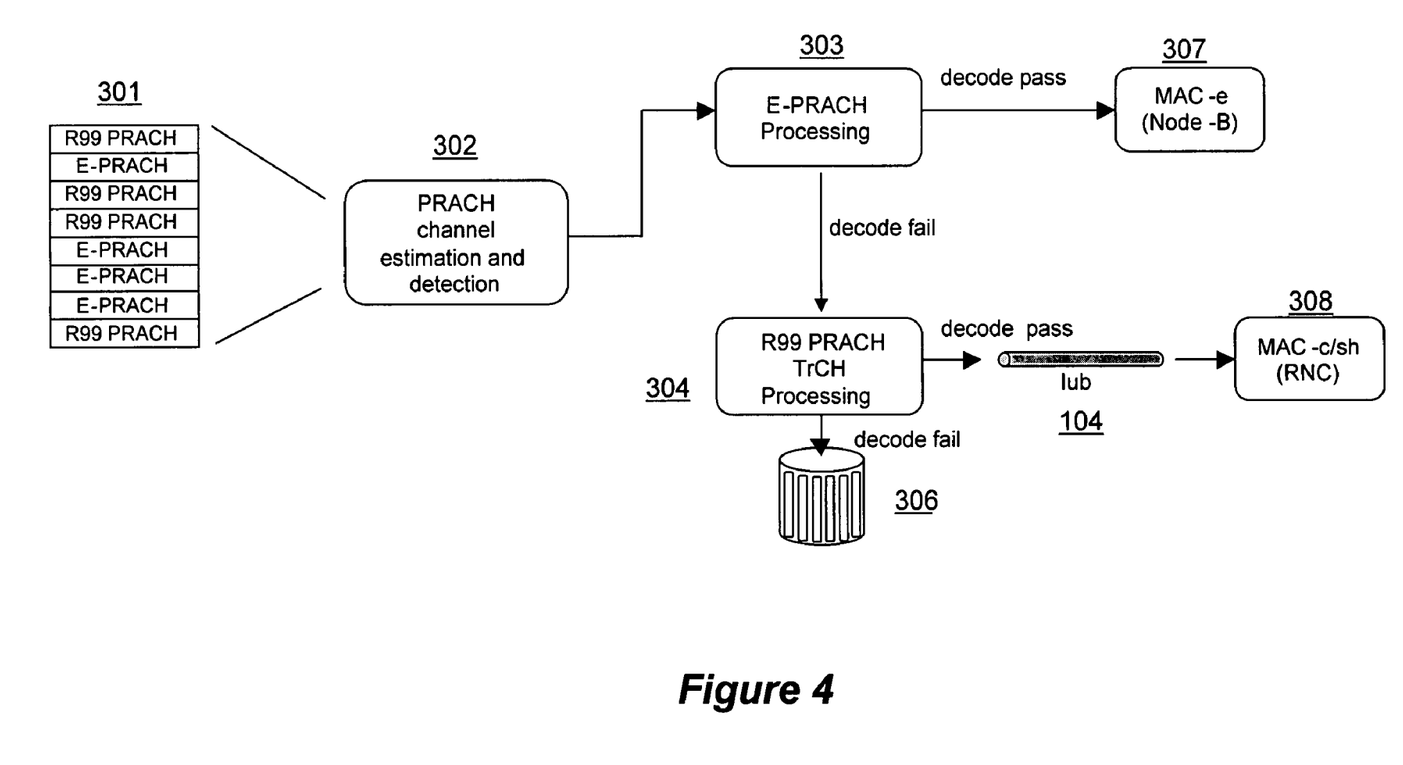
FIG. 4 illustrates an embodiment of the invention with sequential packet decoding.

Referring to FIG. 4, a mixture of R99 PRACH and E-PRACH data packets arrive at the physical layer front end 302 of a Node-B for common processing. Subsequently, each packet is sent to E-PRACH decoding 303. If E-PRACH decoding succeeds, the data packet is passed on to the Node-B's MAC-e 307 as an E-PRACH data packet, otherwise the data packet is passed on to the R99 PRACH decoder 304. If R99 PRACH decoding 304 succeeds, the data packet is transmitted through Iub 104 to the MAC-c/sh or RNC 308 as a R99 PRACH data packet, otherwise, the data packet is discarded 306 as a corrupted R99 PRACH data packet or a different data packet type. It should be understood that although in FIG. 4, E-PRACH decoding is performed prior to R99 PRACH decoding, the order in which sequential decoding of E-PRACH and R99 PRACH are performed may be reversed.

A common "front-end" PRACH data packet identification and demodulation mechanism (302 in FIGS. 3 and 4) may be used for both E-PRACH and R99 PRACH data packets if the physical channel structures are similar. This is a preferred embodiment. Due to the use of this common front-end detection procedure, the probability of detecting an E-PRACH or a R99 PRACH data packet given nothing was transmitted are not affected.

Some reliabilities of interest include: (i) P(E|99), the probability of detecting an E-PRACH given a R99 PRACH was transmitted; and (ii) P(R99|E), the probability of detecting a R99 PRACH given an E-PRACH was transmitted. These probabilities are a complex function of the various constituent functional blocks of the transport channel processing chains, such as (for example) the type of forward error correction, the rate matching applied to each RACH type, the length of the CRC employed. However, the E-PRACH transport channel processing and encoding can be designed such as to ensure low probabilities P(E|99) and P(R99|E). It is preferable to leave the transport channel processing applied to R99 PRACH unchanged, as this channel is commonly used by legacy terminals and Node-Bs).

Embodiments of the invention include several permutations and/or combinations of the transport channel processing as applied to E-PRACH data packets, as well as many simple modifications to assist in "decorrelating" the transport channel processing applied to E-PRACH from that applied to R99 PRACH to improve their separability at the Node-B receiver.

CRC Masking

For the CRC masking embodiments, the CRC field calculated for E-PRACH undergoes an exclusive OR operation with a specified bit sequence that is not applied to R99-PRACH (this lack of application is equivalent to masking with the all-zeros sequence). For example, if the CRC is bit-wise inverted (masking sequence of all-ones), then this gives the maximum distance codeword from the R99-PRACH CRC codeword, thereby maximizing separability of E-PRACH and R99 PRACH for this particular embodiment method.

Figure 5A:
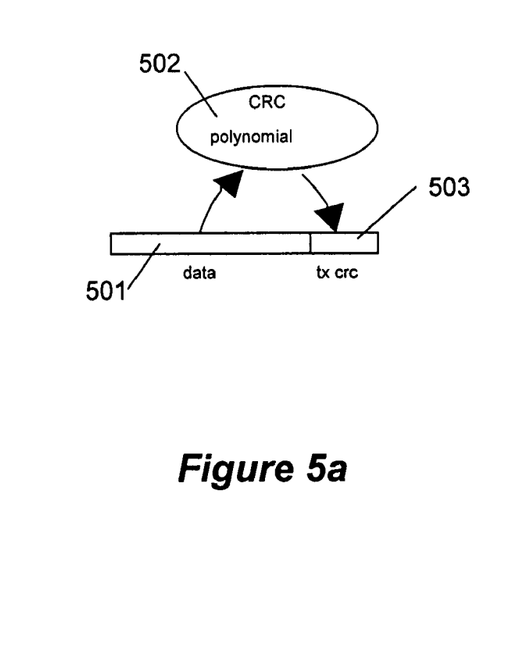
FIG. 5a illustrates CRC checksum generation for a R99 PRACH data packet.
Figure 6A:
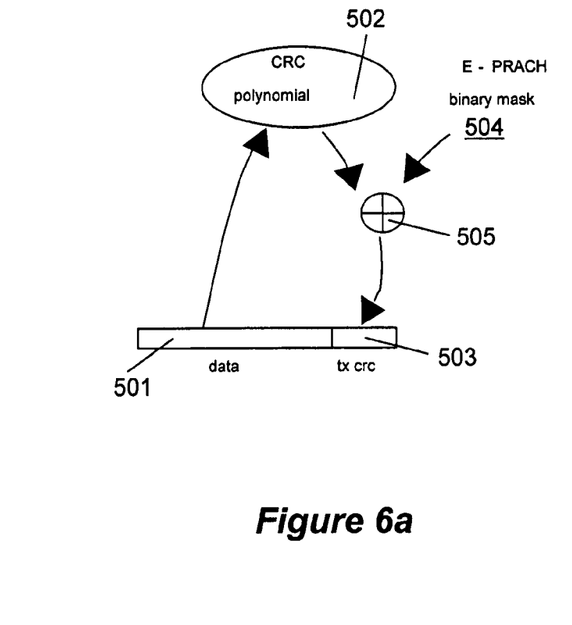
FIG. 6a illustrates modified CRC checksum generation for an E-PRACH data packet.

A further embodiment of the CRC masking procedure can be implemented as follows:

The user equipment (UE) generates a PRACH of E-type or R99-type (501 in FIGS. 5a and 6a).

The UE calculates the CRC binary word using the CRC polynomial as normal (502 in FIGS. 5a and 6a).

If the PRACH is of R99 type, the CRC word is appended to the information data without modification (503 in FIG. 5a).

If the PRACH is of E-type, the CRC word is first XOR'd (505 in FIG. 6a) with a non-zero binary sequence (504 in FIG. 6a) of the same length as the CRC word, and is then appended (503 in FIG. 5a). The same non-zero binary sequence is used by all UE's transmitting E-PRACH The transmission is made and the detection of the PRACH transmission type is performed in the Node-B receiver The Node-B receiver attempts two CRC decodes, looking for zero remainder in both cases.

For the first decode, the received data is simply run through the CRC polynomial and the result compared with the received copy of the appended CRC word. If the two binary words are identical, the CRC is said to have passed and the PRACH is of R99-type.

For the second decoding, the received data is run through the CRC polynomial, then XOR'd with the known E-PRACH binary masking sequence. This is then compared to the received copy of the appended CRC word. If the two binary words are identical, the CRC is said to have passed and the PRACH is of E-type.

Figure 5B:
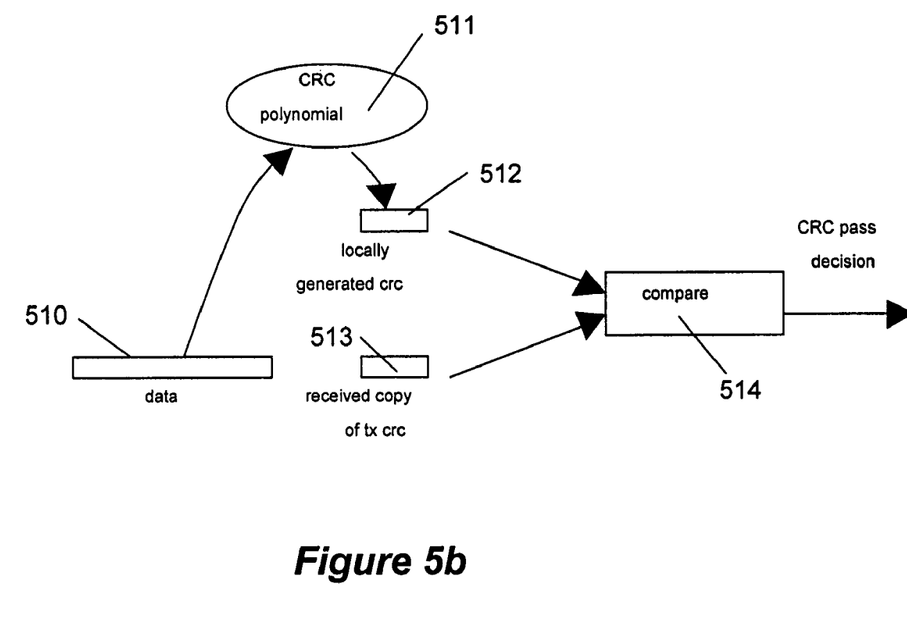
FIG. 5b illustrates CRC checksum checking for a R99 PRACH data packet.
Figure 6B:
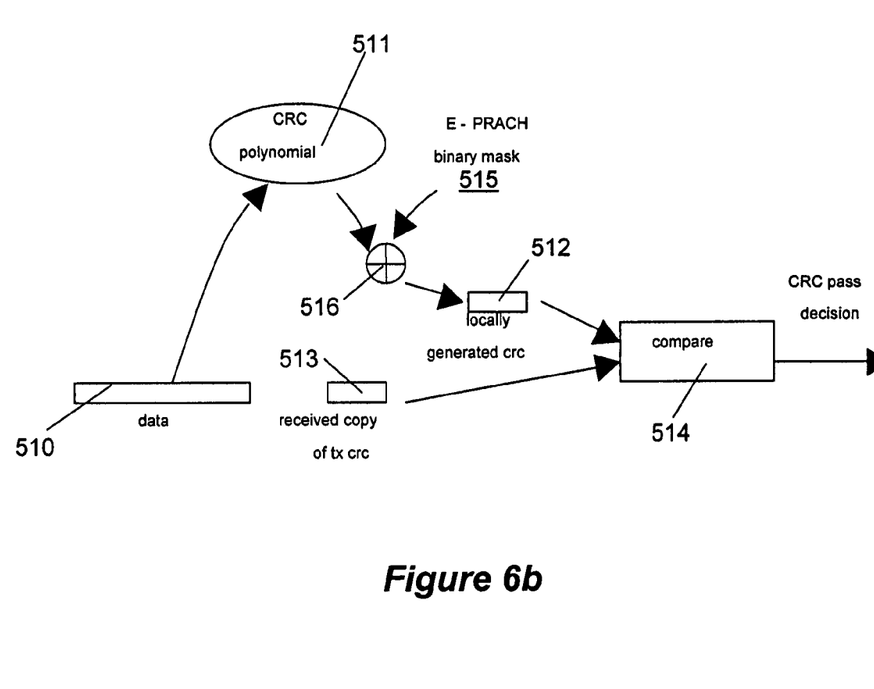
FIG. 6b illustrates modified CRC checksum checking for an E-PRACH data packet.

The transmission and valid reception procedures are shown diagrammatically in FIG. 5b for R99 and in FIG. 6b for E-PRACH.

If the wrong reception procedure is applied, the CRC decision is likely to be "fail". If neither reception procedures are successful then the detected PRACH is discarded (either a PRACH was not transmitted or was received with data transmission errors). If one of the reception procedures results in a CRC "pass" decision and the other a "fail" decision, then the PRACH type is ascertained (by considering which reception procedure worked), and the PRACH is forwarded as appropriate for further processing. In the unlikely event that both reception procedures produce a CRC pass decision, further analysis and processing of the payload data may help to reveal the type of PRACH, otherwise the PRACH should be discarded.

FEC Coding

For the modified forward error correction code (FEC) embodiments, the fundamental type of FEC encoding applied to E-PRACH is selected to be different to that applied to R99 PRACH. For example, ½ rate convolutional encoding is often applied to R99 RACH in UTRA systems. Selection of a different available channel coding type for E-PRACH (e.g. ⅓ rate convolutional coding, or ⅓ rate turbo coding) could be used to enable distinction between PRACH types at the receiver. This is due to the fact that if decoding of a PRACH is attempted using a decoder type not matched to the encoder type used in the transmitter, then a high likelihood of CRC failure would result.

Bit Interleaving

For the bit interleaving embodiments, different interleaving structures and patterns are applied to E-PRACH and R99-PRACH transmissions. Interleaving is a method whereby the sequence of output bits from a channel encoder are permuted to result in a re-ordered bit sequence. This is useful in variable radio conditions in which groups or "bursts" of errors often occur together within a certain time period. If the bits affected are re-distributed in time by the receiver by means of de-interleaving, then the likelihood of correct FEC decoding can be improved. The effect of interleaving is thus to re-order the bits output from the channel encoder according to a pattern known by both transmitter and receiver. If different interleaving patterns are used for E-PRACH and R99-PRACH, then an attempt to decode a PRACH with an de-interleaving pattern not matched to the interleaving pattern used in the transmitter is likely to fail subsequent FEC decoding, thus enabling distinction in the receiver between PRACH types via checking of the CRC result.

Rate Matching

For the rate matching embodiments, different rate matching patterns are applied to E-PRACH and R99-PRACH types. Rate matching is a process used at the output of an FEC channel encoder whereby bits are either repeated or "punctured" (deleted) in the output sequence to fit the channel coder output sequence onto the number of bits available on the one-or-more physical channels to which the encoder output sequence is to be mapped and transmitted. Different rate matching patterns can be created by design, or result implicitly for the same pattern design when the FEC channel encoder outputs are different lengths yet need to be mapped to the same number of physical channel bits. If an attempt to decode a PRACH type is made using a rate de-matching pattern not matched to the rate-matching pattern in the transmitter, then the input to the FEC channel decoder in the receiver will not contain the correct bit information sequence and FEC channel decoding is likely to fail. Thus, the use of different rate matching patterns can be used to enable the receiver to distinguish between PRACH types by checking the CRC check status of a decoded transmission.

Bit Scrambling

In the context of the UTRA radio interface, bit scrambling is a procedure wherein the polarity of some of a sequence of bits after the FEC encoding function in the transmitter is reversed according to a pattern known to both transmitter and receiver. For the bit scrambling embodiments, by implementing different bit scrambling procedures for PRACH and E-PRACH, the FEC decoder input would be corrupted in the event that an E-PRACH is attempted to be decoded with R99-PRACH transport channel processing, and vice-versa. FEC decoding is likely to fail in this event and hence the CRC check is also likely to fail, thus enabling the desired separation between the PRACH types.

Variations and extensions of the embodiments described are apparent to one of ordinary skill in the art.

Other applications, features, and advantages of this invention will be apparent to one of ordinary skill in the art who studies this invention disclosure. Therefore the scope of this invention is to be limited only by the following claims.

The invention claimed is:

1. A method of transmitting data packets over a common physical resource, the method comprising, at a User Equipment (UE):
    encoding a first type of random access data packet for a transmission to be terminated at a base station;
    encoding a second type of random access data packet for a transmission to be terminated at a radio network controller (RNC);
    transmitting the first type of random access data packet to the base station using the common physical resource;
    transmitting the second type of random access data packet to the base station on using the common physical resource, wherein the first type of random access data packet is distinguishable from the second type of random access data packet by at least one different channel coding parameter and being capable of satisfying a data integrity criterion of a first decoder and not being capable of satisfying a data integrity criterion of a second decoder.

2. The method of claim 1, wherein the first type of random access data packet is distinguishable from the second type of random access data packet and is for allowing the base station to determine routing for the random access data packet.

3. The method of claim 1, wherein the common physical resource is described by a Third Generation Partnership Project (3GPP) Universal Terrestrial Radio Access (UTRA) Time Division Duplex (TDD) specification, and carries signaling information related to an enhanced uplink packet data communication from the UE to a scheduling function in the base station.

4. The method claim 1, wherein the first type of random access data packet is distinguishable from the second type of random access data packet by a cyclic redundancy code (CRC) of the random access data packet.

5. The method of claim 4, wherein the CRC of the random access data packet is modified by combining with a masking bit sequence using an exclusive OR function.

6. The method of claim 1, wherein the first type of random access data packet is distinguishable from the second type of random access data packet by a forward error correction (FEC) code of the random access data packet.

7. The method of claim 1, wherein the first type of random access data packet is distinguishable from the second type of random access data packet by a bit-interleaving pattern of the random access data packet.

8. The method of claim 1, wherein the first type of random access data packet is distinguishable from the second type of random access data packet by a rate matching pattern of the data packet.

9. The method of claim 1, wherein the first type of random access data packet is distinguishable from the second type of random access data packet by a bit scramble of the data packet.

10. The method of claim 1, wherein the first type of random access data packet and the second type of random access data packet have at least a section of bit ordering reversal.

11. The method of claim 1, wherein the first type of random access data packet indicates signaling information from the UE to an uplink scheduling entity in the base station.

12. The method of claim 1, wherein the second type of random access data packet indicates information from the UE to a Radio Network Controller (RNC).

13. A User Equipment (UE) for encoding random access data packets for transporting over a common physical resource, the UE comprising:
    logic for encoding a first type of random access data packet for a transmission to be terminated at a base station;
    logic for encoding a second type of random access data packet for a transmission to be terminated at a radio network controller (RNC);
    logic for transmitting the first type of random access data packet to the base station using the common physical resource;
    logic for transmitting the second type of random access data packet to the base station using the common physical resource, wherein the first type of random access data packet is distinguishable from the second type of random access data packet by at least one different channel coding parameter and being capable of satisfying a data integrity criterion of a first decoder and not being capable of satisfying a data integrity criterion of a second decoder.

14. A non-transitory computer program product having executable program code stored therein for modifying a data packet, the program code operable for, when executed at a User Equipment (UE):
    encoding a first type of random access data packet for a transmission over a common physical resource to be terminated at a base station;
    encoding a second type of random access data packet for a transmission over the common physical resource to be terminated at a radio network controller (RNC);
    transmitting the first type of random access data packet to the base station on using the common physical resource;
    transmitting the second type of random access data packet to the base station using the common physical resource, wherein the first type of random access data packet is distinguishable from the second type of random access data packet by at least one different channel coding parameter and being capable of satisfying a data integrity criterion of a first decoder and not being capable of satisfying a data integrity criterion of a second decoder.

15. A method of decoding a type of random access data packet, received over a common physical resource, the method comprising, at a base station:
    receiving a random access data packet using the common physical resource from a User Equipment (UE);
    determining, by a first random access decoder, whether the received random access data packet is of a first type of random access data packet to be terminated at the base station by determining if a data integrity criterion of the first random access decoder is met; and
    routing the received random access data packet to a radio network controller (RNC) to be terminated at the RNC when the received random access data packet is determined not to be of the first type of random access data packets, wherein said first type random access packet is distinguishable from a second type random access packet by at least one different channel coding parameter.

16. The method of claim 15, wherein the common physical resource is described by a Third Generation Partnership Project (3GPP) Universal Terrestrial Radio Access (UTRA) Time Division Duplex (TDD) specification, and the received random access data packet carries signaling information pertaining to an enhanced uplink packet data communication from the UE to a scheduling function in the base station.

17. The method of claim 15, wherein the first random access decoder determines whether the received random access data packet comprises a modified cyclic redundancy code.

18. The method of claim 17, wherein the modified cyclic redundancy code of the received random access data packet is combined with a masking bit sequence by an exclusive OR function.

19. The method of claim 15, further comprising determining by a second random access decoder, whether the received random access data packet is of the second type of random access data packet by determining if a data integrity criterion of the second random access decoder is met.

20. The method of claim 19, wherein the first random access decoder has a different de-interleaver than the second random access decoder.

21. The method of claim 19, wherein the first random access decoder has a different inverse rate matching than the second random access decoder.

22. The method of claim 19, wherein the first random access decoder has a different bit de-scrambling than the second random access decoder.

23. The method of claim 19, wherein the first random access decoder reverses bit ordering for at least a section of the received data compared to the second random access decoder.

24. A base station for decoding a random access data packet received over a common physical resource, the base station comprising:
    logic for receiving a random access data packet using a random access channel using the common physical resource from a User Equipment (UE);
    a first random access decoder for determining whether the received random access data packet is of a first type of random access data packet to be terminated at the base station by determining if a data integrity criterion of the first random access decoder is met; and
    logic for routing the received random access data packet to a radio network controller (RNC) to be terminated at the RNC when the received random access data packet is determined not to be of the first type of random access data packets, wherein said first type random access packet is distinguishable from a second type random access packet by at least one different channel coding parameter.

25. A non-transitory computer program product having executable program code stored therein for modifying a data packet, the program code operable for, when executed at a base station:

receiving a random access data packet on a random access channel using a common physical resource from a User Equipment (UE);

determining, by a first random access decoder, whether the received random access data packet is of a first type of random access data packet to be terminated at the base station by determining if a data integrity criterion of the first random access decoder is met;

routing the received random access data packet to a radio network controller (RNC) to be terminated at the RNC when the received random access data packet is determined not to be of the first type of random access data packets, wherein said first type random access packet is distinguishable from a second type random access packet by at least one different channel coding parameter.

* * * * *